US009323951B2

(12) United States Patent
Craig et al.

(10) Patent No.: US 9,323,951 B2
(45) Date of Patent: Apr. 26, 2016

(54) ENCRYPTED WARRANTY VERIFICATION AND DIAGNOSTIC TOOL

(71) Applicant: International Business Machines Corporation, Armonk, NY (US)

(72) Inventors: Ronald E. Craig, Pittsboro, NC (US); James D. Creasman, Apex, NC (US); Robert A. Gibson, Raleigh, NC (US); John A. Poetzinger, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 13/802,496

(22) Filed: Mar. 13, 2013

(65) Prior Publication Data

US 2014/0281443 A1 Sep. 18, 2014

(51) Int. Cl.
| | |
|---|---|
| *G08B 29/00* | (2006.01) |
| *G06F 7/04* | (2006.01) |
| *G06F 15/177* | (2006.01) |
| *H04L 9/32* | (2006.01) |
| *G06F 21/64* | (2013.01) |
| *G06Q 30/00* | (2012.01) |
| *G06F 21/86* | (2013.01) |
| *H04L 29/06* | (2006.01) |
| *G06F 21/57* | (2013.01) |
| *G06F 21/31* | (2013.01) |
| *G06F 9/44* | (2006.01) |

(52) U.S. Cl.
CPC .............. *G06F 21/64* (2013.01); *G06Q 30/012* (2013.01); *G06F 9/4401* (2013.01); *G06F 21/31* (2013.01); *G06F 21/57* (2013.01); *G06F 21/86* (2013.01); *H04L 63/08* (2013.01)

(58) Field of Classification Search
CPC ......... G06F 21/31; G06F 21/86; G06F 21/57; G06F 9/4401; H04L 63/08
USPC .................................. 726/16, 34; 713/1, 168
See application file for complete search history.

(56) References Cited

U.S. PATENT DOCUMENTS

| | | | |
|---|---|---|---|
| 5,724,425 | A | 3/1998 | Chang et al. |
| 6,519,652 | B1 * | 2/2003 | Sadiq ............................ 719/316 |
| 6,694,204 | B1 | 2/2004 | Bair, III et al. |
| 7,761,910 | B2 | 7/2010 | Ransom et al. |
| 2002/0198729 | A1 | 12/2002 | Burkes et al. |

(Continued)

FOREIGN PATENT DOCUMENTS

WO 2011017028 2/2011

*Primary Examiner* — Aravind Moorthy
(74) *Attorney, Agent, or Firm* — VanLeeuwen & VanLeeuwen; Damion C. Josephs (57) ABSTRACT

According to one embodiment of the present disclosure, an approach is provided in which a diagnostic system retrieves encrypted utilization data from an electronic system that were generated from utilization data corresponding to the electronic system's usage. The diagnostic system decrypts the encrypted utilization data and determines whether the decrypted utilization data are valid. When the decrypted utilization data are valid, the diagnostic system displays the decrypted utilization data on a display. In another embodiment, the diagnostic system retrieves cryptographically-protected utilization data from the electronic system and determines the authenticity of the cryptographically-protected utilization data. Once the cryptographically-protected utilization data are authenticated, the diagnostic system displays the corresponding utilization data on a display.

21 Claims, 6 Drawing Sheets

(56) References Cited

U.S. PATENT DOCUMENTS

| | | |
|---|---|---|
| 2003/0120923 A1 | 6/2003 | Gilman et al. |
| 2004/0010392 A1* | 1/2004 | Menard et al. ............... 702/178 |
| 2006/0184379 A1 | 8/2006 | Tan et al. |
| 2007/0073459 A1 | 3/2007 | Webster et al. |
| 2009/0118899 A1 | 5/2009 | Carlson |
| 2011/0160953 A1* | 6/2011 | Wempen ....................... 701/33 |
| 2014/0100885 A1* | 4/2014 | Stern ............................. 705/3 |

\* cited by examiner

ENCRYPTED WARRANTY VERIFICATION AND DIAGNOSTIC TOOL

BACKGROUND

The present disclosure relates to extracting encrypted utilization data from an electronic system and decrypting the encrypted utilization data to verify the electronic system's warranty status and provenance.

Electronic systems, such as storage devices, computers, etc., typically have a warranty period that may be based on a purchase date, an in-service date, an amount of usage, and/or a combination of criteria. When an electronic system is returned to an authorized service facility for repair, the service facility typically determines whether the electronic system is within the warranty period. In order to make such a determination, the service facility may obtain information from the electronic system, such as checking a serial number label, checking visual indicators for misuse (e.g., burnt fuses), and etcetera. A malicious user, however, may alter such information prior to sending the electronic system in for repair in an effort to have the cost of the repair or replacement covered by the electronic system's warranty. In some cases, the malicious user may present a counterfeit electronic system as a genuine article.

BRIEF SUMMARY

According to one embodiment of the present disclosure, an approach is provided in which a diagnostic system retrieves encrypted utilization data from an electronic system, which were generated from utilization data corresponding to the electronic system's usage. The diagnostic system decrypts the encrypted utilization data and determines whether the decrypted utilization data are valid. When the decrypted utilization data are valid, the diagnostic system displays the decrypted utilization data on a display.

In another embodiment, the diagnostic system retrieves cryptographically-protected utilization data from the electronic system and determines the authenticity of the cryptographically-protected utilization data. Once the cryptographically-protected utilization data are authenticated, the diagnostic system displays the corresponding utilization data on a display.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list)

of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

Figure 1:
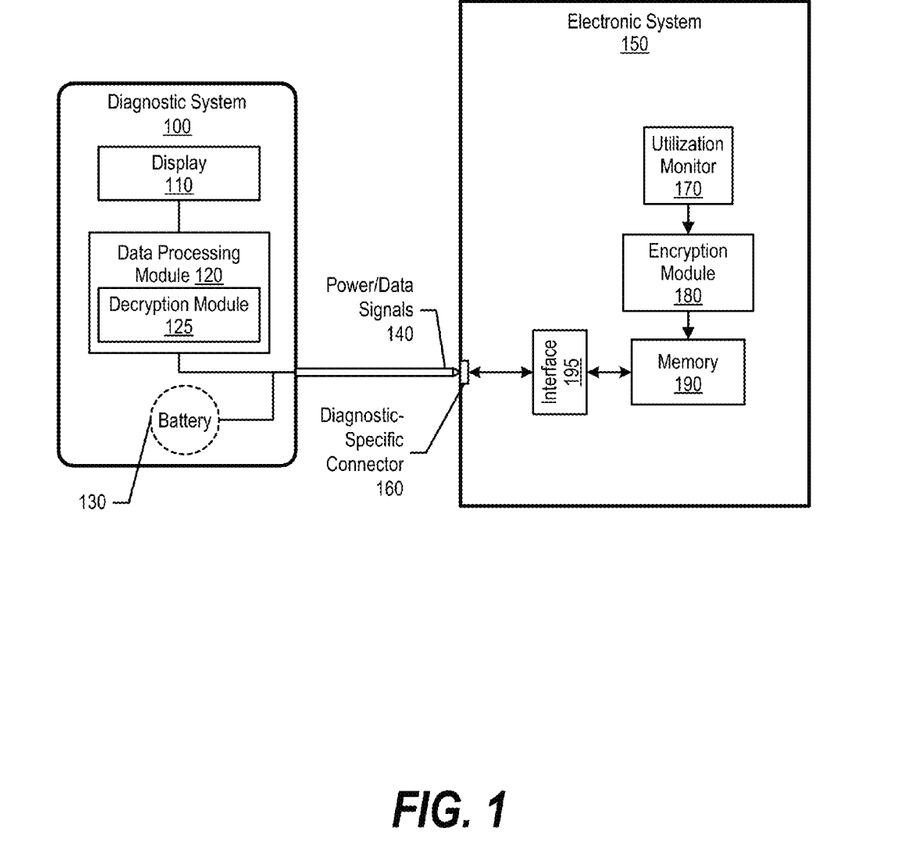
FIG. 1 is a diagram showing a diagnostic system coupled to an electronic system and extracting encrypted utilization data from the electronic system.

FIG. 1 is a diagram showing a diagnostic system extracting encrypted utilization data from an electronic system to verify warranty status of the electronic system. Diagnostic system 100, in one embodiment, is a self-powered handheld unit that allows a service repair technician to extract encrypted utilization data from electronic system 150, which has been sent in for repair. In this embodiment, the service repair technician may easily determine whether electronic system 150 is authentic and still within warranty based upon a message that diagnostic system 100 displays on display 110. Electronic system 150 may be system utilized by a user, such as a storage device, a computer, a laptop, a tablet, and etcetera.

During electronic system 150's lifetime, utilization monitor 170 analyzes electronic system 150's operation and collects diagnostic data that utilization monitor 170 sends to encryption module 180. Encryption module, in turn, encrypts the utilization data and stores the encrypted utilization data in memory 190. Utilization monitor 170, in one embodiment, resides in electronic system 150's firmware and monitors activity such as the first time a user boots-up electronic system 150 (e.g., "in-service" date), the number of read cycles or write cycles electronic system 150 performs, and etcetera.

In one embodiment, encryption module 180 may use an asymmetric key approach to encrypt the utilization data. For example, encryption module 180 may use a private key to encrypt the utilization data, which allows diagnostic system 100's decryption module 125 to decrypt the encrypted utilization data using a public key (discussed below). In another embodiment, encryption module 180 may use a symmetric key approach using a key composed at least in part from a secret key known to a legitimate manufacturer and/or service facility. For example, encryption module 180 may use a symmetric key to encrypt the utilization data, which allows diagnostic system 100's decryption module 125 to decrypt the encrypted utilization data using the same key. As will be understood by those skilled in the art, the composition of this symmetric key may be composed of data specific to the manufacturer and/or data specific to the particular electronic system under test. In one embodiment, portions of the system-specific data may be stored in devices such as a magnetic storage medium included in the electronic system, a resonant circuit included in the electronic system, an RFID included in the electronic system, or a bar code or identification number on the electronic system.

As those skilled in the art will also appreciate, the current disclosure may be embodied by cryptographically-protecting the utilization data through other approaches. In one embodiment, electronic system 150 may calculate a checksum or message authentication code for electronic system 150's utilization data instead of or in addition to encrypting the utilization data. This checksum, or keyed hash, may be calculated by electronic system 150's encryption module 180 and provided to diagnostic system 100, along with the utilization data, for the purposes of verifying the authenticity of the utilization data, the device, and that the utilization data have not been altered.

In one embodiment, the checksum may be calculated in any number of ways known to those skilled in the art, such as HMAC (hash-based message authentication code), CMAC (cipher-based message authentication code), hashes, keyed hashes, or message digest algorithms. In yet another embodiment, digital signatures may be used to digitally sign the utilization data, the encrypted utilization, a hash of the utilization data, a hash of the encrypted utilization data, and etcetera. In this embodiment, diagnostic system 100 checks the digital signature to authenticate the digitally signed material.

Some of the embodiments discussed above may be combined to protect and authenticate electronic system 150's integrity and utilization data. For example, a symmetric encryption/decryption key may be created for the utilization data, and then the symmetric encryption/decryption key may be encrypted with a private key. In this example, the utilization data are protected by symmetric encryption, and electronic system 150 is authenticated because diagnostic system 100 uses the corresponding public key to properly decrypt the symmetric encryption/decryption key to evaluate the utilization data.

When a user returns electronic system 150 to the manufacturer's authorized service facility for repairs or upgrades, a technician couples diagnostic system 100 to electronic system 150 via diagnostic-specific connector 160. Diagnostic-specific connector 160 may be separate from electronic system 150's main interface connector, which allows diagnostic system 100 the ability to extract the encrypted utilization data from electronic system 150 even when a malicious user intentionally breaks electronic system 150's main interface connector in an effort to limit the ability of a service technician to access utilization information from electronic system 150.

Diagnostic system 100 includes battery 130, which powers diagnostic system 100 and also provides power to electronic system 150 via power/data signals 140 through diagnostic-specific connector 160. In one embodiment, the supplied power powers a portion of electronic system 150, such as only components essential to extracting the encrypted utilization data from memory 190 (e.g., interface 195 and memory 190).

Diagnostic system 100 retrieves the encrypted utilization data from memory 190 via power data signals 140, and decrypts the encrypted utilization data using decrypting module 125. As discussed above, when encryption module 180 uses a private key to encrypt the utilization data, decryption module 125 uses a corresponding public key to decrypt the utilization data. If the encrypted utilization data have not been altered by a malicious user, the decrypted utilization data will be recognizable and in a proper format. However, if a malicious user altered the encrypted utilization data, such as attempting to falsify diagnostic data and/or manufacturer information, the decrypted utilization data are unrecognizable. In one embodiment, data processing module 120 checks a checksum of the decrypted utilization data to determine if the decrypted utilization data are valid.

Data processing module 120 analyzes the decrypted utilization data for validity. When the decrypted utilization data are valid, data processing module 120 displays the decrypted utilization data (or a portion thereof) on display 110 (see FIG. 2A and corresponding text for further details). However, when the decrypted utilization data are invalid, data processing module 120 displays a message indicating an error, such as that electronic system 150 is out of warranty or is counterfeit (see FIG. 2B and corresponding text for further details).

Figure 2A:
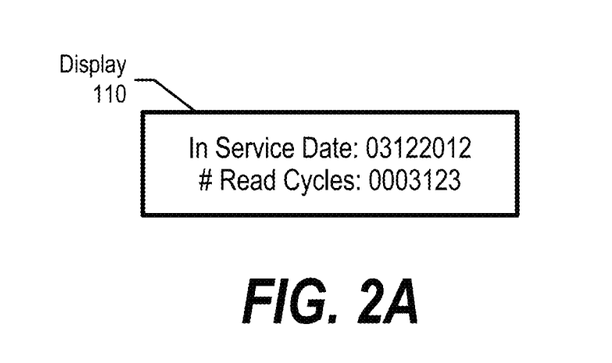
FIG. 2A depicts a display window displaying decrypted utilization data after a diagnostic system successfully extracted and decrypted encrypted utilization data from a genuine electronic system.

FIG. 2A depicts a display window displaying decrypted utilization data after a diagnostic system successfully extracted and decrypted encrypted utilization data. The embodiment shown in FIG. 2A indicates that a user's first boot-up timestamp and the number of read cycles are included in the decrypted utilization data. Data processing module 120, in turn, displays "In Service Date: 03122012" (corresponding with the user's first boot-up timestamp) and "# Read Cycles: 0003123" on display 110. As such, a service technician may quickly determine whether electronic system 150 is still within the warranty period.

In one embodiment, the decrypted utilization data may include extended warranty information, which may be displayed on display 110 and allows the service technician to determine real-time as to electronic system 150's warranty status. In this embodiment, display 110 may include a line that reads "Extended Warranty: 2 years."

Figure 2B:
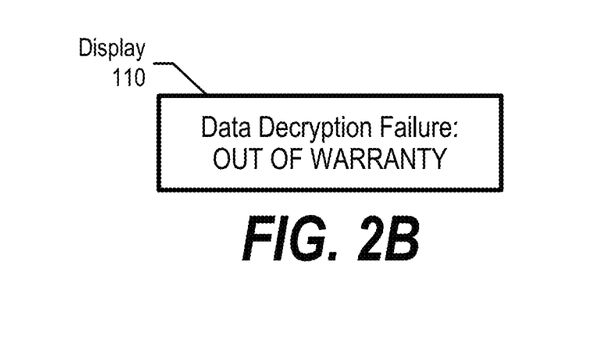
FIG. 2B depicts a display window displaying an error message in response to a diagnostic system determining that an encrypted utilization data decryption processes resulted in invalid data.

FIG. 2B depicts a display window displaying an error message in response to a diagnostic system determining that decrypted utilization data are invalid. When a malicious user tampers with electronic system 150's encrypted utilization data, the tampered encrypted utilization data are unrecognizable when decrypted by decryption module 125. As such, data processing module 120 displays an error message, such as "OUT OF WARRANTY" on display 110 to indicate that electronic system 150's encrypted utilization data have been tampered with and is no longer covered under warranty.

Figure 3:
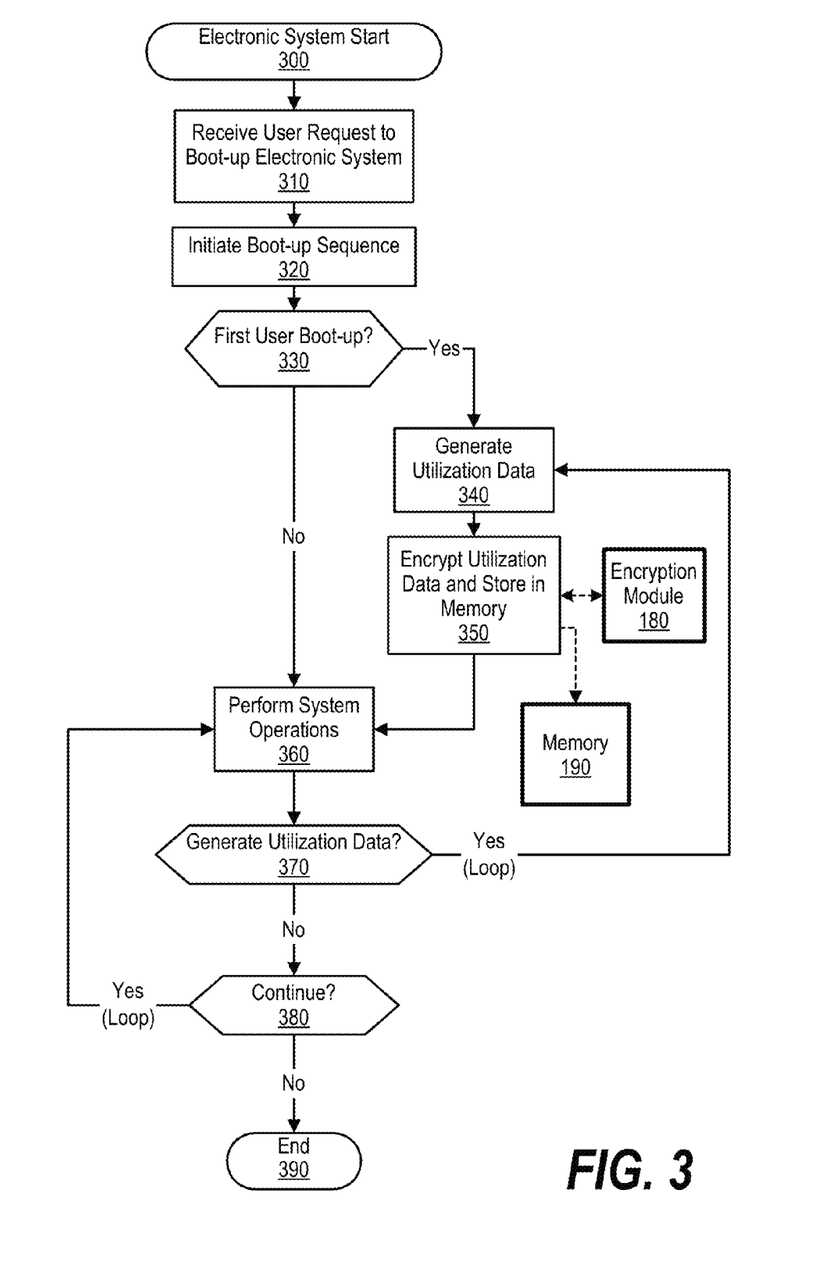
FIG. 3 is a flowchart showing steps taken in an electronic system collecting and encrypting utilization data that, in turn, are stored in the electronic system's local memory area.

FIG. 3 is a flowchart showing steps taken in an electronic system collecting and encrypting utilization data that, in turn, are stored in a local memory area. Electronic system processing commences at 300, whereupon the electronic system receives a boot-up request from a user at step 310 (e.g., activating a power button).

The electronic system initiates a boot-up sequence at step 320, and a determination is made as to whether the boot-up is a first boot-up occurrence initiated by a user (e.g., as opposed to a manufacturer test, decision 330). In one embodiment, the electronic system determines whether the boot-up operation is a first user boot-up by checking whether the encrypted utilization data are stored in a pre-defined location in memory 190. In this embodiment, if the encrypted utilization is already stored in the pre-defined location, the electronic system knows that the first user boot-up has already occurred.

If the boot-up is a first user boot-up occurrence, decision 330 branches to the "Yes" branch, whereupon the electronic system generates utilization data at step 340. In one embodiment, the utilization data include a first user boot-up timestamp based upon a system time. In this embodiment, the first user boot-up timestamp may be used as the electronic system's in-service date (see FIGS. 2A, 4, and corresponding text for further details).

At step 350, the electronic system utilizes encryption module 180 to encrypt (and/or cryptographically protect, e.g., via HMAC, CMAC, etc.) the utilization data and store the utilization data in memory 190. In one embodiment, encryption module 180 uses an asymmetric key approach. In this embodiment, encryption module 180 uses a "private key" to encrypt the utilization and, in turn, a diagnostic system utilizes a corresponding "public key" to decrypt the encrypted utilization data (see FIG. 4 and corresponding text for further details).

On the other hand, if the boot-up is not the user's first boot-up, decision 330 branches to the "No" branch, bypassing steps 340 and 350. At step 360, the electronic system performs system operations (e.g., reads/writes), and a determination is made as to whether to generate utilization data during the system operations (decision 370). For example, the electronic system may be configured to generate utilization data each time that the electronic system reads/writes from/to memory. If the electronic system should generate utilization data at a particular point during system operations, decision 370 branches to the "Yes" branch, which loops back to generate, encrypt, and store utilization data.

On the other hand, if the electronic system should not generate utilization data, decision 370 branches to the "No" branch, whereupon a determination is made as to whether to continue (e.g., power down, decision 380). If the electronic system should continue, decision 380 branches to the "Yes" branch, which loops back to continue to perform system operations. This looping continues until the electronic system should terminate, at which point decision 380 branches to the "No" branch, whereupon electronic system processing ends at 390.

Figure 4:
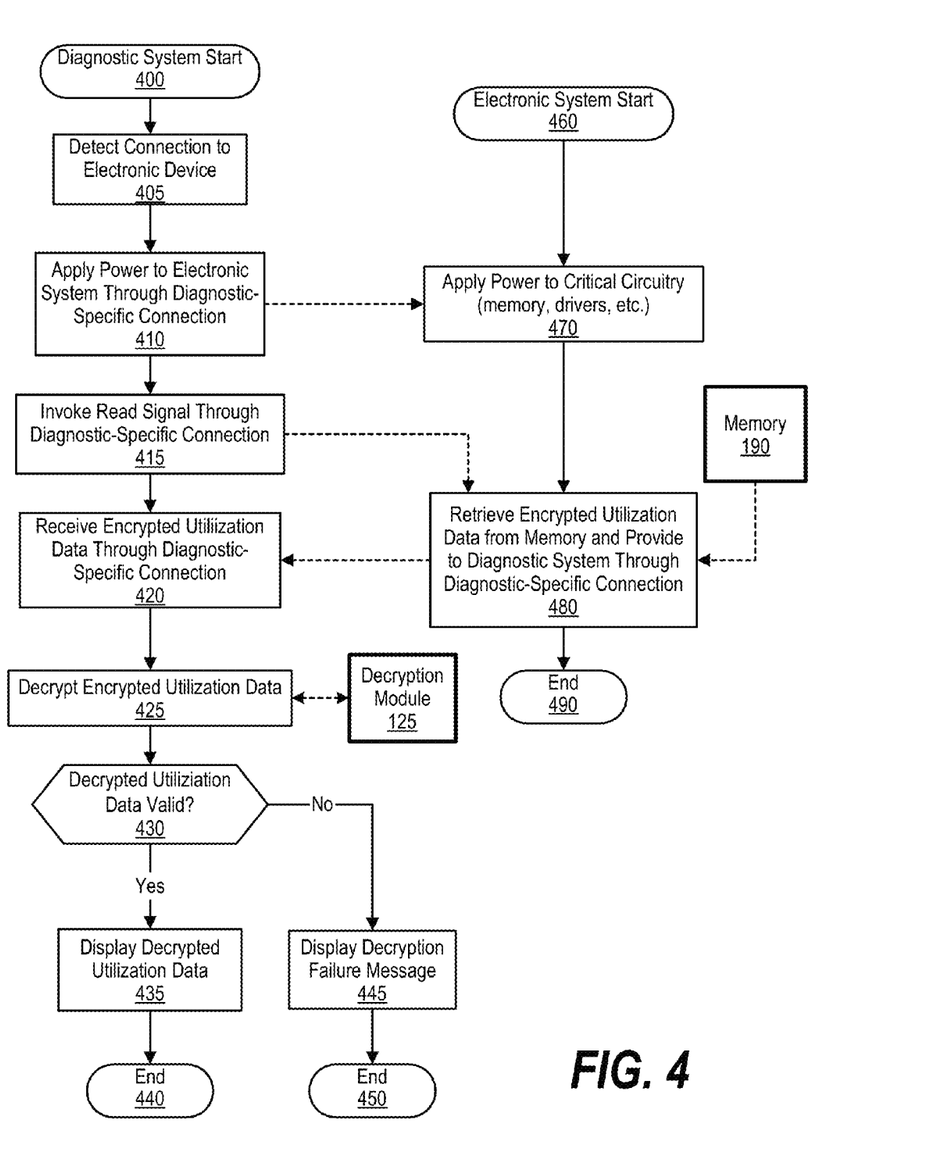
FIG. 4 is a flowchart showing steps taken in a diagnostic system decrypting encrypted utilization data extracted from an electronic system and determining the decrypted utilization data's validity.

FIG. 4 is a flowchart showing steps taken in a diagnostic system decrypting encrypted utilization data extracted from an electronic system and determining the validity of the decrypted utilization data. Diagnostic system processing commences at 400, whereupon the diagnostic system detects a connection to the electronic system in response to a user (e.g., service technician) connecting the diagnostic system to the electronic system (step 405). At step 410, the diagnostic system applies power to the electronic system through the diagnostic-specific connection.

Figure 5:
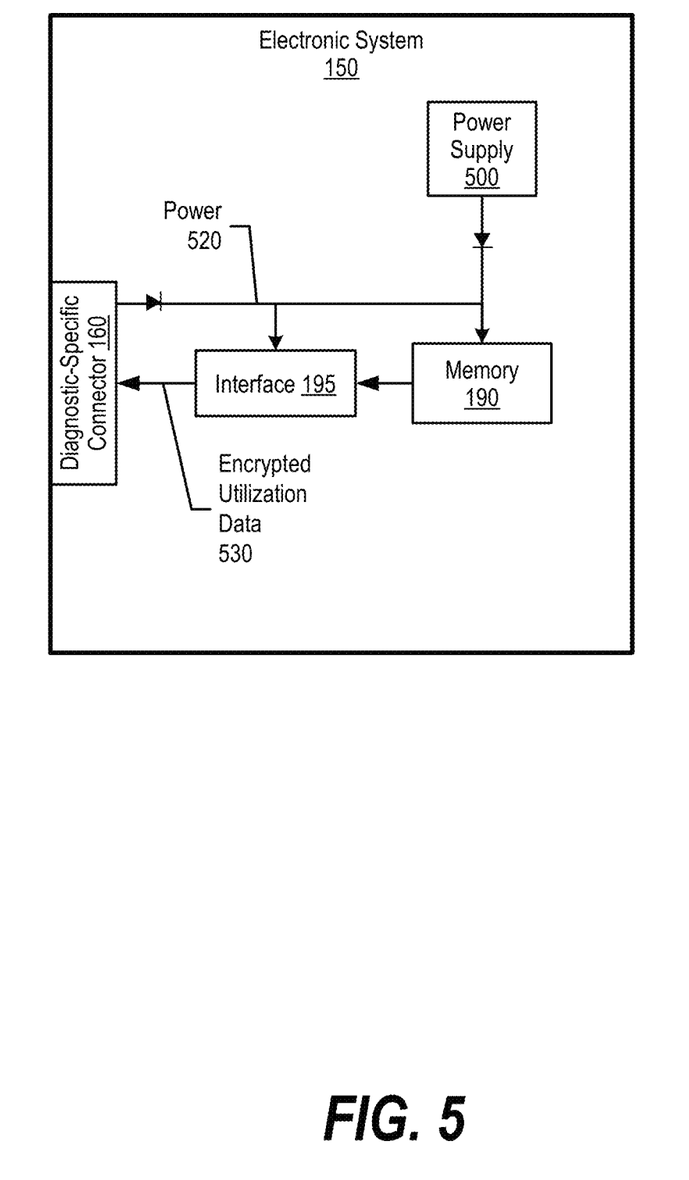
FIG. 5 depicts an embodiment of a portion of an electronic system's components being powered by an external power source to retrieve encrypted utilization data from the electronic system.

Electronic system processing commences at step 460, whereupon the electronic system receives power from the diagnostic system and applies power to the electronic system's critical circuitry, such as a portion of the electronic system's memory and diagnostic interface circuitry (see FIG. 5 and corresponding text for further details).

The diagnostic system, at step 415, invokes a read signal to the electronic system through the diagnostic-specific connection. The electronic system, at step 480, receives the read signal and retrieves encrypted utilization data from memory 190, which the electronic system provides to the diagnostic system through the diagnostic-specific connection. Electronic system processing ends at 490.

The diagnostic system, at step 420, receives the encrypted utilization data. At step 425, the diagnostic system utilizes decryption module 125 to decrypt the encrypted utilization data (and/or authenticate via HMAC, CMAC, etc. discussed earlier). In one embodiment, decryption module 125 utilizes a public key to decrypt encrypted utilization data that were encrypted by a private key (see FIG. 3 and corresponding text for further details).

The diagnostic system determines whether the decrypted utilization data are valid (decision 430), which indicates whether the encrypted utilization data were altered by a malicious user or whether the electronic system is a counterfeit system. In one embodiment, the diagnostic system performs a checksum on the decrypted utilization data to determine the decrypted utilization data's validity.

If the decrypted utilization data are valid, decision 430 branches to the "Yes" branch, whereupon the diagnostic system displays a message on display 190 that indicates the decrypted utilization data are valid, such as an in-service date included in the decrypted utilization data (step 435, see FIG. 2A and corresponding text for further details). Diagnostic system processing ends at 440.

On the other hand, if the decrypted utilization data are invalid, decision 430 branches to the "No" branch, whereupon the diagnostic system displays a message on display 190 that indicates the decrypted utilization data are invalid, such as an "out of warranty" message (step 445, see FIG. 2B and corresponding text for further details). Diagnostic system processing ends at 450.

FIG. 5 depicts an embodiment of a portion of an electronic system's components that are powered by an external power source to retrieve encrypted utilization data from the electronic system. Electronic system 150 includes power supply 500, which supplies power to electronic system 150's components during normal system operation. When electronic system 150 is retuned to an authorized service center, the service center may not wish to spend time to completely power up electronic system 150. As such, diagnostic system 100 provides power 520 via diagnostic-specific connector 160, which supplies power to components that are critical to supplying encrypted utilization data 530 to diagnostic system 100, such as memory 190 and interface 195 (e.g., latches, clock circuitry, etc.). In turn, encrypted utilization data 530 are sent from electronic system 150 to diagnostic system 100 through diagnostic-specific connector 160.

Figure 6:
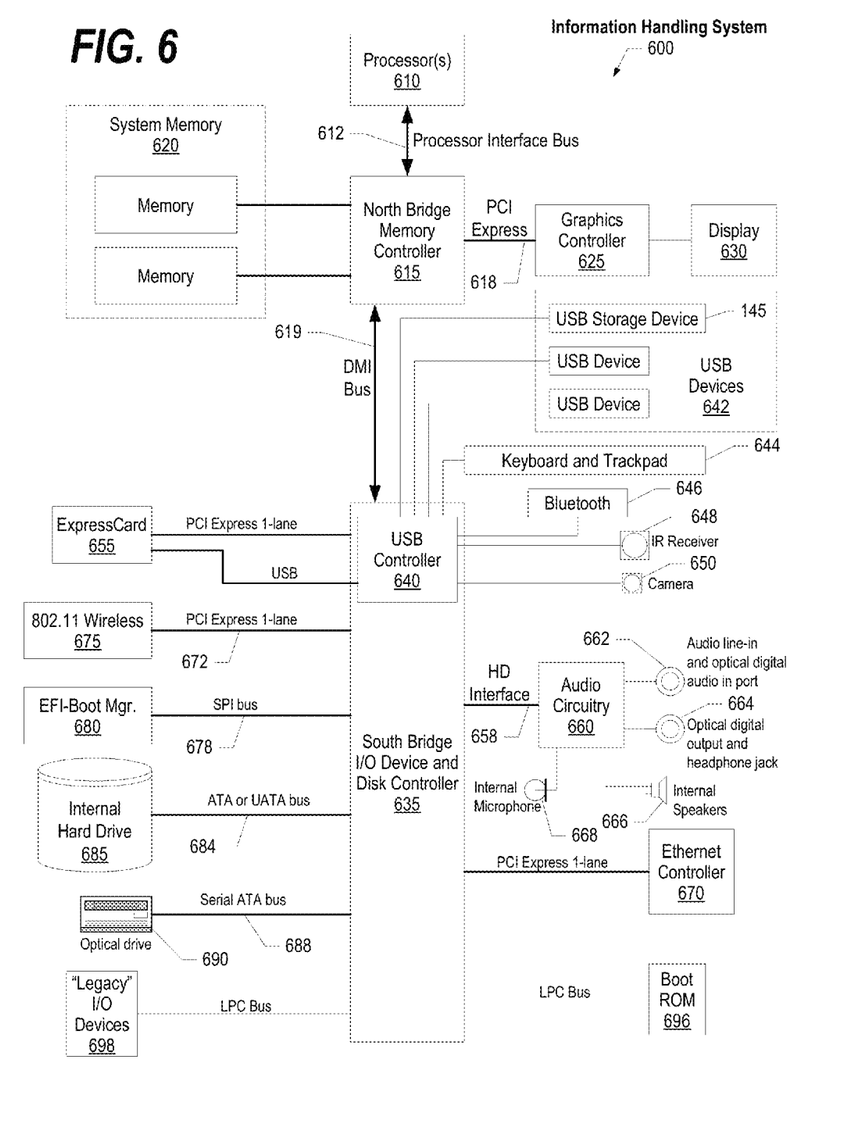
FIG. 6 is a block diagram of a data processing system in which the methods described herein can be implemented.

FIG. 6 illustrates information handling system 600, which is a simplified example of a computer system capable of performing the computing operations described herein. Information handling system 600 includes one or more processors 610 coupled to processor interface bus 612. Processor interface bus 612 connects processors 610 to Northbridge 615, which is also known as the Memory Controller Hub (MCH). Northbridge 615 connects to system memory 620 and provides a means for processor(s) 610 to access the system memory. Graphics controller 625 also connects to Northbridge 615. In one embodiment, PCI Express bus 618 connects Northbridge 615 to graphics controller 625. Graphics controller 625 connects to display device 630, such as a computer monitor.

Northbridge 615 and Southbridge 635 connect to each other using bus 619. In one embodiment, the bus is a Direct Media Interface (DMI) bus that transfers data at high speeds in each direction between Northbridge 615 and Southbridge 635. In another embodiment, a Peripheral Component Interconnect (PCI) bus connects the Northbridge and the Southbridge. Southbridge 635, also known as the I/O Controller Hub (ICH) is a chip that generally implements capabilities that operate at slower speeds than the capabilities provided by the Northbridge. Southbridge 635 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 696 and "legacy" I/O devices (using a "super I/O" chip). The "legacy" I/O devices (698) can include, for example, serial and parallel ports, keyboard, mouse, and/or a floppy disk controller. The LPC bus also connects Southbridge 635 to Trusted Platform Module (TPM) 695. Other components often included in Southbridge 635 include a Direct Memory Access (DMA) controller, a Programmable Interrupt Controller (PIC), and a storage device controller, which connects Southbridge 635 to nonvolatile storage device 685, such as a hard disk drive, using bus 684.

ExpressCard 655 is a slot that connects hot-pluggable devices to the information handling system. ExpressCard 655 supports both PCI Express and USB connectivity as it connects to Southbridge 635 using both the Universal Serial Bus (USB) the PCI Express bus. Southbridge 635 includes USB Controller 640 that provides USB connectivity to devices that connect to the USB. These devices include webcam (camera) 650, infrared (IR) receiver 648, keyboard and trackpad 644, and Bluetooth device 646, which provides for wireless personal area networks (PANs). USB Controller 640 also provides USB connectivity to other miscellaneous USB connected devices 642, such as a mouse, removable nonvolatile storage device 645, modems, network cards, ISDN connectors, fax, printers, USB hubs, and many other types of USB connected devices. While removable nonvolatile storage device 645 is shown as a USB-connected device, removable nonvolatile storage device 645 could be connected using a different interface, such as a Firewire interface, etcetera.

Wireless Local Area Network (LAN) device 675 connects to Southbridge 635 via the PCI or PCI Express bus 672. LAN device 675 typically implements one of the IEEE 802.11 standards of over-the-air modulation techniques that all use the same protocol to wireless communicate between information handling system 600 and another computer system or device. Optical storage device 690 connects to Southbridge 635 using Serial ATA (SATA) bus 688. Serial ATA adapters and devices communicate over a high-speed serial link. The Serial ATA bus also connects Southbridge 635 to other forms of storage devices, such as hard disk drives or solid state drives. Audio circuitry 660, such as a sound card, connects to Southbridge 635 via bus 658. Audio circuitry 660 also provides functionality such as audio line-in and optical digital audio in port 662, optical digital output and headphone jack 664, internal speakers 666, and internal microphone 668. Ethernet controller 670 connects to Southbridge 635 using a bus, such as the PCI or PCI Express bus. Ethernet controller 670 connects information handling system 600 to a computer network, such as a Local Area Network (LAN), the Internet, and other public and private computer networks.

While FIG. 6 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

While particular embodiments of the present disclosure have been shown and described, it will be obvious to those skilled in the art that, based upon the teachings herein, changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
retrieving, by a diagnostic system, encrypted utilization data from an electronic system, wherein the encrypted utilization data are generated from utilization data corresponding to usage of the electronic system;
decrypting the encrypted utilization data by the diagnostic system, the decrypting resulting in decrypted utilization data;
in response to determining that the decrypted utilization data are valid, extracting a first user boot-up timestamp from the decrypted utilization data that specifies a first occurrence in an electronic system lifecycle at which the electronic system was booted-up by a user; and
displaying, by the diagnostic system, at least a portion of the decrypted utilization data on a display, wherein the displayed portion of the decrypted utilization data includes the first user boot-up time.

2. The method of claim 1 further comprising:
displaying an out of warranty message on the display in response to determining that the decrypted utilization data are invalid.

3. The method of claim 1 wherein the diagnostic system is a hand-held self-powered unit that couples to the electronic system through one or more diagnostic-specific connections that are separate from a main connection included on the electronic system.

4. The method of claim 3 wherein the diagnostic system provides power to the electronic system through the one or more diagnostic-specific connections.

5. The method of claim 4 wherein the power provided to the electronic system powers only a portion of the electronic system that provides the encrypted utilization data to the diagnostic system through the one or more diagnostic-specific connections.

6. The method of claim 1 further comprising:
prior to retrieving the encrypted utilization data from the electronic system:
applying power by the diagnostic system to the electronic system through a diagnostic-specific connection, wherein the power provided to the electronic system powers only a portion of the electronic system; and
invoking a read signal by the diagnostic system to the electronic system through the diagnostic specific connection, wherein the read signal invokes the electronic system to supply the encrypted utilization data to the diagnostic system;
in response to decrypting the encrypted utilization data and determining that the decrypted utilization data are invalid, displaying an error message on the display, wherein the invalid decrypted utilization data indicates that the electronic system is selected from the group consisting of a tampered system and a counterfeit system.

7. An information handling system comprising:
one or more processors;
a memory coupled to at least one of the processors;
a display accessible to at least one of the processors;
a set of computer program instructions stored in the memory and executed by at least one of the processors in order to perform actions of:
retrieving encrypted utilization data from an electronic system, wherein the encrypted utilization data are generated from utilization data corresponding to usage of the electronic system;
decrypting the encrypted utilization data, the decrypting resulting in decrypted utilization data; and
in response to determining that the decrypted utilization data are valid, extracting a first user boot-up timestamp from the decrypted utilization data that specifies a first occurrence in an electronic system lifecycle at which the electronic system was booted-up by a user; and
displaying at least a portion of the decrypted utilization data on a display, wherein the displayed portion of the decrypted utilization data includes the first user boot-up time.

8. The information handling system of claim 7 wherein the set of computer program instructions, when executed by at least one of the processors, performs additional actions comprising:
displaying an out of warranty message on the display in response to determining that the decrypted utilization data are invalid.

9. The information handling system of claim 7 wherein the information handling system is a hand-held self-powered unit that couples to the electronic system through one or more diagnostic-specific connections that are separate from a main connection included on the electronic system.

10. The information handling system of claim 9 wherein the information handling system provides power to the electronic system through the one or more diagnostic-specific connections.

11. The information handling system of claim 10 wherein the power provided to the electronic system powers only a portion of the electronic system that provides the encrypted utilization data to the diagnostic system through the one or more diagnostic-specific connections.

12. A computer program product stored in a computer readable storage medium, comprising computer program code that, when executed by an information handling system, causes the information handling system to perform actions comprising:
retrieving encrypted utilization data from an electronic system, wherein the encrypted utilization data are generated from utilization data corresponding to usage of the electronic system;
decrypting the encrypted utilization data, the decrypting resulting in decrypted utilization data; and
in response to determining that the decrypted utilization data are valid, extracting a first user boot-up timestamp from the decrypted utilization data that specifies a first occurrence in an electronic system lifecycle at which the electronic system was booted-up by a user; and
displaying at least a portion of the decrypted utilization data on a display, wherein the displayed portion of the decrypted utilization data includes the first user boot-up time.

13. The computer program product of claim 12 wherein the computer program code, when executed by the information handling system, causes the information handling system to perform additional actions comprising:
displaying an out of warranty message on the display in response to determining that the decrypted utilization data are invalid.

14. The computer program product of claim 12 wherein the information handling system is a hand-held self-powered unit that couples to the electronic system through one or more diagnostic-specific connections that are separate from a main connection included on the electronic system, and wherein the information handling system provides power to the electronic system through the one or more diagnostic-specific connections.

15. A method comprising:
retrieving, by a diagnostic system, cryptographically-protected utilization data from an electronic system, wherein the cryptographically-protected utilization data are generated from utilization data corresponding to usage of the electronic system;
determining, by the diagnostic system, whether the cryptographically-protected utilization data are authentic;
in response to determining that the cryptographically-protected utilization data are authentic, extracting a first user boot-up timestamp from the decrypted utilization data that specifies a first occurrence in an electronic system lifecycle at which the electronic system was booted-up by a user; and
displaying, by the diagnostic system, at least a portion of the decrypted utilization data on a display, wherein the displayed portion of the decrypted utilization data includes the first user boot-up time.

16. The method of claim 15 further comprising:
displaying an out of warranty message on the display that indicates the cryptographically-protected utilization data are unauthentic.

17. The method of claim 16 wherein the error message indicates the electronic system is out of warranty.

18. The method of claim 15 wherein the determining of whether the cryptographically-protected utilization data are authentic further comprises analyzing a message authentication code corresponding to at least a portion of the cryptographically-protected utilization data, the message authentication code selected from the group consisting of a hash-based message authentication code and a cipher-based message authentication code.

19. The method of claim 15 wherein the diagnostic system is a hand-held self-powered unit that couples to the electronic system through one or more diagnostic-specific connections that are separate from a main connection included on the electronic system.

20. The method of claim 19 wherein the diagnostic system provides power to the electronic system through the one or more diagnostic-specific connections that powers only a portion of the electronic system that provides the encrypted utilization data to the diagnostic system through the one or more diagnostic-specific connections.

21. The method of claim 15 further comprising:
prior to retrieving the cryptographically-protected utilization data from the electronic system:
applying power by the diagnostic system to the electronic system through a diagnostic-specific connection, wherein the power provided to the electronic system powers only a portion of the electronic system; and invoking a read signal by the diagnostic system to the electronic system through the diagnostic specific connection, wherein the read signal invokes the electronic system to supply the cryptographically-protected utilization data to the diagnostic system;

in response to determining that the cryptographically-protected utilization data are unauthentic, displaying an error message on the display, wherein the unauthentic cryptographically-protected utilization data indicates that the electronic system is selected from the group consisting of a tampered system and a counterfeit system.

* * * * *